United States Patent

Eng et al.

[11] Patent Number: 4,743,104
[45] Date of Patent: May 10, 1988

[54] VARIABLE AREA MANIFOLDS FOR RING MIRROR HEAT EXCHANGERS

[75] Inventors: Albert Eng; Donald R. Senterfitt, both of Jupiter, Fla.

[73] Assignee: The United States of America as represented by the Secretary of the Air Force, Washington, D.C.

[21] Appl. No.: 917,933

[22] Filed: Oct. 14, 1986

[51] Int. Cl.⁴ .......................... G02B 5/08; G02B 7/18
[52] U.S. Cl. .................................................. 350/610
[58] Field of Search ............... 350/610, 609, 607, 611, 350/319

[56] References Cited

U.S. PATENT DOCUMENTS 3,861,787  1/1975  Locke et al. ................... 350/288
3,894,795  7/1975  Laurens ......................... 350/319
4,121,175  10/1978  Hamil et al. ................. 331/94.5 D
4,370,568  1/1983  Lumley ........................... 307/260

Primary Examiner—Jon W. Henry
Attorney, Agent, or Firm—William G. Auton; Donald J. Singer

[57] ABSTRACT

A laser ring mirror assembly is disclosed which supports and cools an annular ring mirror of a high powered laser with a cooling manifold which has a coolant flow design which is intended to reduce thermal distortions of the ring mirror by minimizing azimuthal variations in temperature around its circumference. The cooling manifold has complementary pairs of cooling passages each of which conduct coolant in opposite flow directions. The manifold also houses adjusters which vary the depth between the annular ring mirror and each cooling passage, and which vary the flow area of the cooling passage to produce a control over the cooling characteristics of the cooling manifold.

4 Claims, 2 Drawing Sheets

VARIABLE AREA MANIFOLDS FOR RING MIRROR HEAT EXCHANGERS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to laser systems, and more specifically to a ring mirror assembly for use in laser systems to reduce mirror distortions resulting from temperature variations.

High energy laser cavities are commonly equipped with one or more ring mirrors, which reflect radiant energy into the cavity in order to further stimulate the emission of coherent radiation. It is recognized that the alignment of these mirrors is of critical importance in order to maintain maximum output.

Frequently, laser mirrors experience thermally induced misalignment after they have been initially correctly aligned. The task of reducing the effects of temperature variations on ring mirrors in high power lasers is alleviated, to some extent, by the techniques disclosed in the following U.S. patents, which are incorporated herein by reference:

U.S. Pat. No. 3,861,787 issued to Locke et al;
U.S. Pat. No. 4,121,175 issued to Kirtland et al;
U.S. Pat. No. 3,894,795 issued to Laurens; and
U.S. Pat. No. 4,370,568 issued to Lumley.

The above-cited references all disclose cooling systems which are used in high powered lasers. The patent of Locke et al discloses a laser mirror having a cooling manifold with nested, annular, cooling channels. Each of the channels has a uniform cross-section. The Laurens reference discloses a laser cavity having two concentric cooling passages for the laser window and multiple conduits.

The annular cooling channels which are normally used in the ring mirror assembly of high power laser systems has been found by experience to be subject to azimuthal temperature variations. These temperature variations extend to and include the cooling passages to produce a demonstrable temperature difference between the coolant in the inlet manifold and the coolant in the outlet manifold. Constant area manifolds, such as disclosed by Locke et al, can not produce azimuthally uniform temperatures in the ring mirror assembly, or the ring mirror itself, because the coolant will always heat up as it passes around the circumference of the manifold.

From the foregoing discussion, it is apparent that there currently remains a need for a ring mirror assembly with an inherent flow distribution design which will reduce or eliminate azimuthal temperature variations around the ring mirror. The present invention is intended to satisfy that need.

SUMMARY OF THE INVENTION

The present invention is a ring mirror assembly with a cooling manifold which has a flow design which provides a thermal balance between separate channels of temperature coolants to minimize azimuthal distortions on the ring mirror. In one embodiment of the present invention, the ring mirror is housed within a variable area cooling manifold which has a plurality of sets of nested, annular, cooling channels which each conduct coolant into the manifold, around ¼ of its circumference, and out of the manifold. In this embodiment, four sets of cooling channels collectively cool the entire circumference of the manifold with minimal azimuthal temperature variations.

Each set of cooling channels has a variable flow area, and further provides a thermal balance using pairs of cooling channels which are parallel to each other and flow in opposite directions such that their inlets are adjacent to the other channel's outlet. The use of pairs of cooling passages with opposite directions of flow is designed to compensate for the gradual heating of coolant occurring in each individual channel as the coolant progresses through the manifold. The placement of the inlet of each channel near the outlet of its complementary pair provides an inherent thermal balance between the separate channels in the ring mirror assembly. This thermal balance in enhanced by endowing each individual channel with means of varying its flow area so that adjustments may be made to the cooling characteristics of the manifold.

The ring mirror assembly of the present invention has a circumferentially tapered annular manifold. This tapering allows the heat exchanger plate (mirror surface) to be positioned at varying depths from the pairs of cooling channels, which results in additional control over the cooling characteristics of the manifold. This additional control is an asset to system users since higher performance optics and lighter mirrors require lower temperature variations in their cooling manifolds.

It is one object of the present invention to provide a ring mirror assembly for use in high energy lasers which reduces thermally induced mirror distortions.

It is another object of the present invention to minimize azimuthal temperature variations around the circumference of an annular ring mirror assembly.

It is another object of the present invention to enhance the control of the user over the cooling characteristics of a ring mirror assembly.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a ring mirror assembly which is intended for use in high powered laser systems. This particular assembly employs a cooling manifold which has a flow design which provides a thermal balance between separate channels of temperature coolants to minimize azimuthal distortions which would otherwise occur in the ring mirror.

Figure 1:
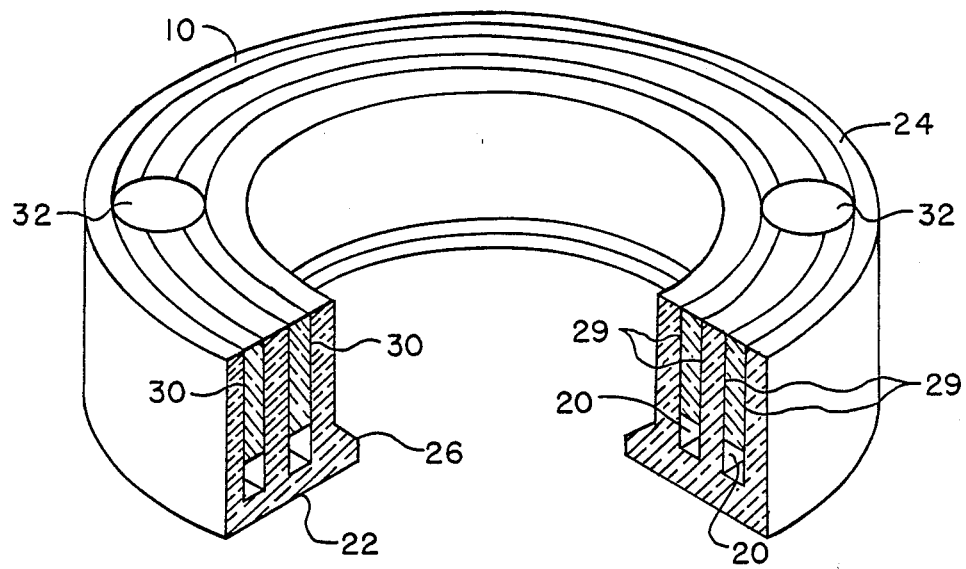
FIG. 1 is a sectional view of a prior art laser mirror assembly.

The reader's attention is now directed towards FIG. 1, which is a sectional view of the prior art laser mirror assembly from the Locke et al reference. In FIG. 1, the transfer mirror 10 is cooled by cooling channels 20 which are annular and concentric and supplied with coolant by a supply and return hole 32. Each of these cooling channels 20 has a uniform cross-section, and the spacing between the reflecting surface and each of the passages 20 is uniform. While the laser mirror of Locke et al is exemplary in the art, and is resistant to thermal distortion with the use of pressurized coolant, experience with similar laser mirror assemblies has shown that temperature variations around the circumference of the mirror results in thermal distortion of the laser mirror.

Higher performance optics and lighter mirrors are especially susceptible to distortion induced by temperature variations in cooling channels. In prior art laser mirror assemblies inherently are subject in azimuthal temperature variations for the following reason. All coolant in cooling passages tends to heat up and increase in temperature as the coolant progresses around the laser manifold. When the cooling passage is a single annular ring, the coolant begins at a relatively low temperature and at the outlet is at a relatively higher temperature so that azimuthal variations in the coolant temperature are a natural consequence.

Figure 2:
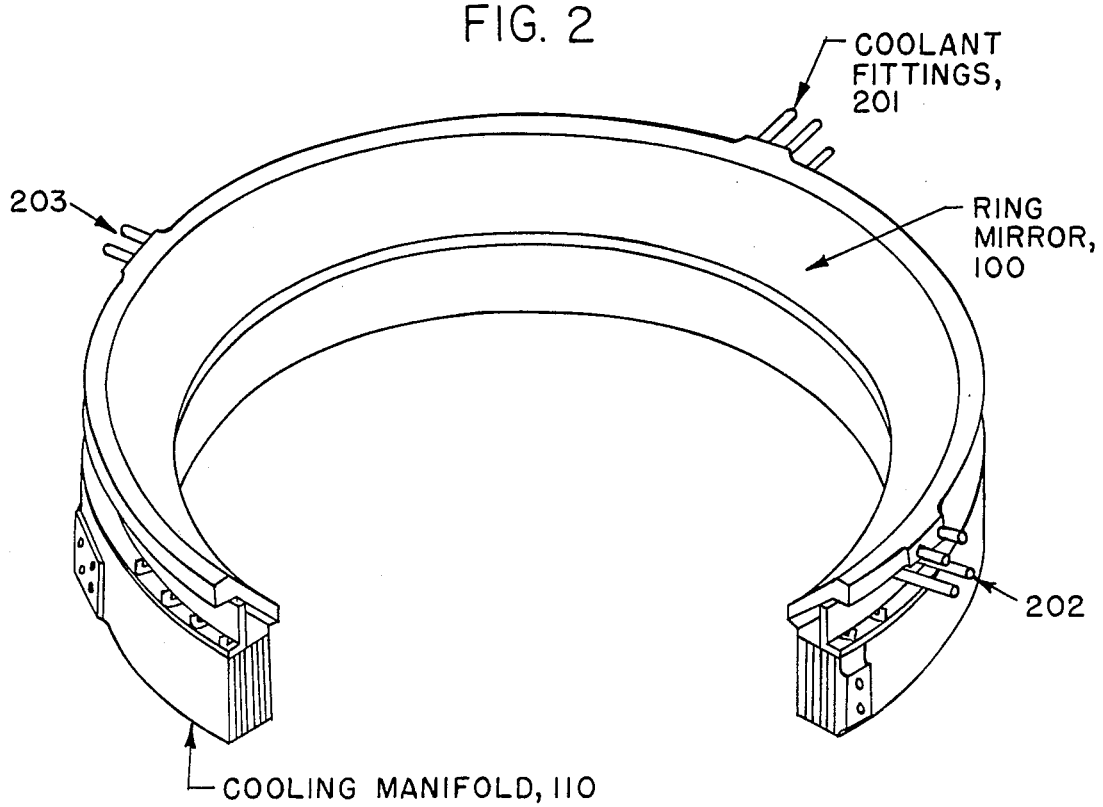
FIG. 2 is a sectional view of the laser mirror assembly of the present invention.

The reader's attention is now directed towards FIG. 2, which is a sectional view of the laser ring mirror assembly of the present invention. The ring mirror 100 is housed on a variable area, annular cooling manifold 110 which has internal cooling passages connected with multiple sets of coolant fitting lcoations 201-203 at equidistant locations from each other about the circumference of the manifold.

Figure 3:
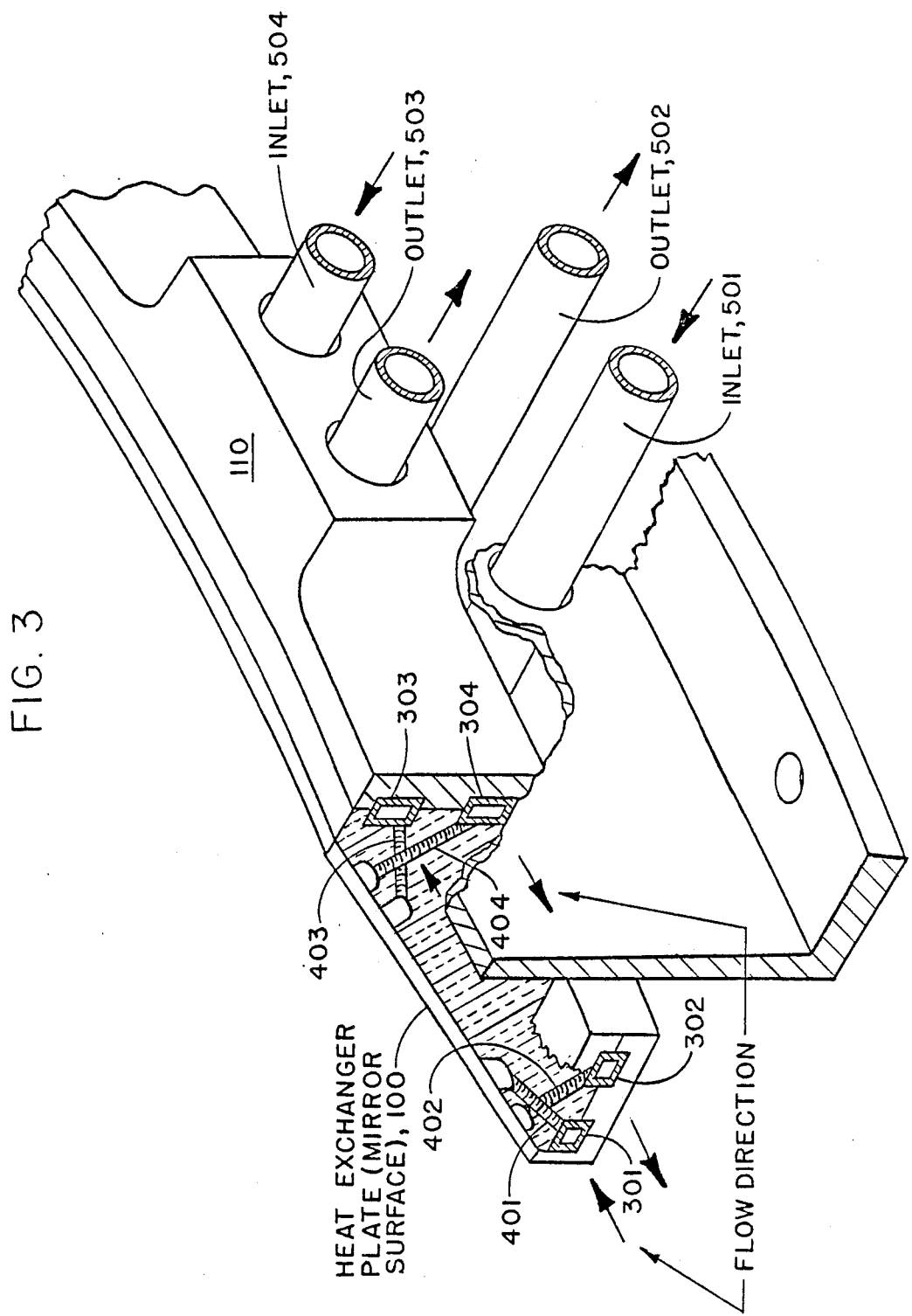
FIG. 3 is a detailed sectional view of the manifold of FIG. 2.

FIG. 3 is a detailed sectional view of the manifold 110 of FIG. 2 at one particular coolant fitting location 201. As indicated in FIG. 3, each coolant fitting location, in this embodiment, entails four coolant fittings: two inlet fittings and two outlet fittings, each of which is connected to a cooling passage. The flow design of this embodiment attains an azimuthal thermal balance around the circumference of the manifold in two ways. First, note that each inlet, and its associated cooling passage, is adjacent to a complementary outlet with and the outlet's cooling passage. The purpose of this flow design is to compensate for the gradual heating of coolant in each passage. As the coolant approaches its outlet, it has increased in temperature. The increase in temperature of coolant at the outlet location is compensated for by the proximity of an inlet fitting where the coolant is at its lowest temperature. This temperature compensation effect is continued in the manifold by the placement of the cooling passages in proximity to each other when the cooling passages are used in sets of pairs, and each individual passage has a flow direction which is the opposite of the flow direction of its complementary passage.

The second flow design feature that attains an azimuthal thermal balance around the circumference of the manifold, is the use of multiple sets of coolant fitting locations 201-203 at equidistant locations from each other around the circumference of the manifold. While the plurality of cooling passages collectively act to cool the entire manifold, each individual passage is fitted with a nested inlet and outlet which only extends over a fraction of the manifold's circumference. This practice of using equidistant fitting locations reduces the opportunity for azimuthal temperature differences to develop in the cooling passage. Such azimuthal temperature difference are an inherent occurence in the prior art systems which use passages which trace through the entire circumference of the manifold. In such systems, the inlet coolant is relatively cool, and the outlet coolant is substantially hotter.

The ring mirror assembly of FIG. 3 enables users to adjust the cooling characteristics of the manifold. This adjustment includes variations in the depth between the heat exchanger plate/mirror surface 100 and the cooling passages 301-304. A variety of alternative mechanisms may be used to obtain this variation in depth. The system of FIG. 3 uses a set of four adjusters 401-404 which extend from each of the cooling passages 301-304 and the heat exchanger plate 100. These adjusters may be threaded screws, turn buckles, or other similar means which position the mirror surface at variable depths from the cooling passages to produce variable cooling characteristics.

As mentioned above, the four adjusters 401-404 may be threaded screws or turnbuckles which extend between the heat exchanger plate/mirror surface 100 and the cooling passages 301-304 to position the mirror at variable depths from the cooling passages. These adjusters 401-404 are each physically connected to the mirror 100 and to the cooling manifold in proximity to one of the cooling passages 301-304. As the turnbuckles (or threaded screws) are elongated, the mirror surface 100 is respectively pushed out away from the cooling passages. As the turnbuckles (or threaded screws) are retracted the mirror surface is pulled closer to the cooling passages. Adjustments are made by turning the turnbuckles to elongate or retract them as desired. The cooling passages 301-304 of FIG. 3 resemble the cooling passages of the prior art system of FIG. 1, in the respect that they are housed in the manifold and don't move.

The primary cause of azimuthal temperature variations is the variation of coolant film coefficients within the manifolds, coupled with the temperature differential between the inlet and exit coolant flows. Higher performance optics and systems with lower coolant flow rates and lighter mirrors, require lower temperature variations in the coolant manifolds. A method to accomplish this, in the present invention, includes a variation of the flow area to maintain constant coolant velocity and film coefficients.

A variety of alternative mechanisms may be used to vary the flow areas of the cooling passages 301-304. For example, the adjusters 401-404 of FIG. 3 might be used to constrict the cross-sectonal area of their associated cooling passages 301-304. By providing each user with the ability to vary the cooling characteristics of the ring mirror assembly, the user may optimize the cooling characteristics to suit the needs of his particular optical system.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A laser ring mirror assembly comprising:
  an annular ring mirror;
  a variable area cooling manifold which is fixed beneath said annular ring mirror to support and cool it with minimized azimuthal temperature variations, said variable area cooling manifold housing a plurality of sets of cooling passages with inlet and outlet fittings which conduct coolant, each set having first and second cooling passages placed in proximity to each other, said first cooling passage having a flow direction opposite of that of said second cooling passage, said opposite direction thereby contributing to an azimuthal thermal balance about said manifold's circumference to minimize thermal distortions in said annular ring mirror; and adjustment means which is housed in said variable area cooling manifold and connected with said annular ring mirror to position it at variable depths from said plurality of sets of cooling passages, said adjustment means thereby allowing users of said laser ring mirror assembly to adjust its thermal cooling characteristics.

2. A laser ring mirror assembly, as defined in claim 1, wherein said outlet fitting of each first cooling passage is in proximity with the inlet fitting of the second cooling passage, and the inlet fitting of each first cooling passage is in proximity with the outlet fitting of the second cooling passage.

3. A laser ring mirror assembly as defined in claim 2, wherein said inlet and outlet fittings of said plurality of sets of cooling passages are equidistantly distributed around the circumference of the variable area cooling manifold.

4. A laser ring mirror assembly, as defined in claim 3, wherein said adjustment means are selected from a group consisting of threaded screws and turnbuckles, each of said adjustment means being connected to said annular ring mirror and the variable area cooling manifold in proximity to one of the cooling passages, said adjustment means thereby being capable of increasing and reducing distance between the annular ring mirror and a cooling passage by displacement of the annular ring mirror.

* * * * *